July 11, 1967     A. C. RISSBERGER, JR     3,330,494
UNIVERSAL FILM REEL
Filed June 22, 1965
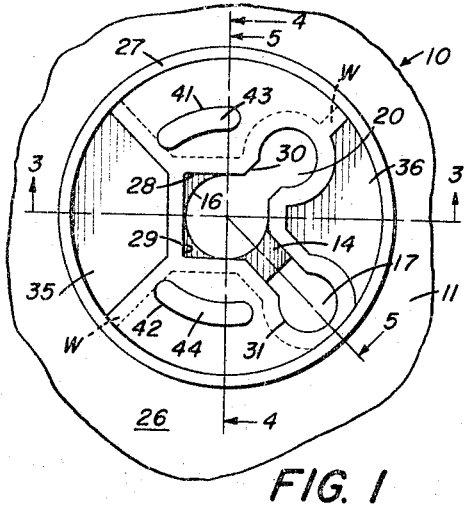
FIG. 1
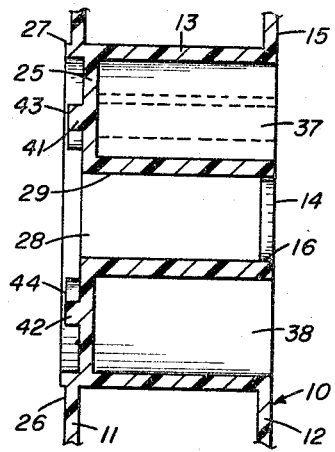
FIG. 4
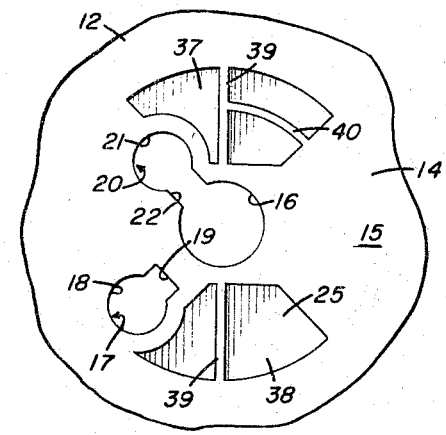
FIG. 2
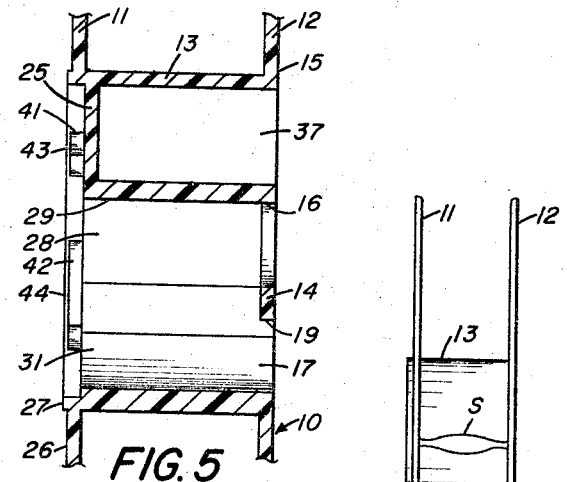
FIG. 5
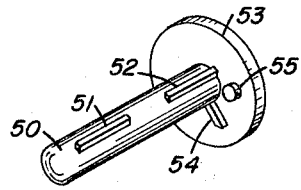
FIG. 6
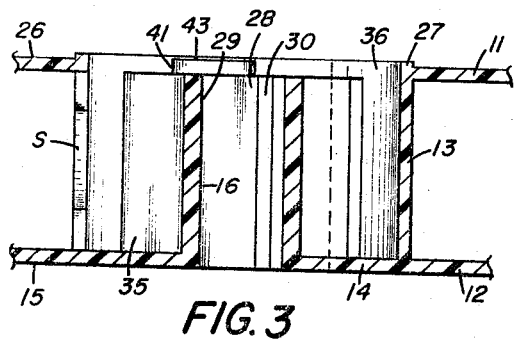
FIG. 3
FIG. 7
ARTHUR C. RISSBERGER JR.
INVENTOR.
BY R. Frank Smith
Lloyd F. Siebrech
ATTORNEY & AGENT

United States Patent Office 3,330,494
Patented July 11, 1967

3,330,494
UNIVERSAL FILM REEL
Arthur C. Rissberger, Jr., Rochester, N.Y., assignor to Eastman Kodak Company, Rochester, N.Y., a corporation of New Jersey
Filed June 22, 1965, Ser. No. 465,925
11 Claims. (Cl. 242—71.8)

The present invention relates to a film reel and more particularly to a universal film reel that is reversibly positionable on a spindle for use in conjunction with various types of photographic apparatus, such as copy cameras and film readers.

It has been the custom to wind raw or unexposed film on a spool and to wind processed film on a reel. In each case, a particular type of film spool or reel is used because of the difference in the manner that a film strip is wound thereon. This difference arises with the need for orienting the emulsion layer on the film strip relative to the core or hub on which the film strip is wound in accordance with the type of photographic apparatus with which it is to be used. For example, in a camera having no reflecting surfaces or mirrors between the lens and film, the raw or unexposed film is wound on a core, or the core of a spool, with the emulsion side toward the core. However, in a camera having such reflecting surfaces or mirrors, whether the emulsion side of the film strip faces toward or away from the core depends on the number of reflections of the image within the camera. In a reader that projects an image from a processed film strip onto an opaque surface, as in a photographic enlarger, the processed film strip is normally wound with the emulsion side facing away from the core of the reel. On the other hand, when the image is projected onto the rear surface of a translucent screen for viewing from the front surface, the emulsion side must be wound toward the core. Generally, when a film strip is an odd number generation of an originally exposed and processed film strip, the emulsion side is wound toward the core, whereas an even number generation of the same film strip is wound with the emulsion side facing away from the core.

In addition to the problem of orientation of the emulsion side of a film strip that is to be wound on a spool or reel, another problem is encountered in that there is no uniformity or standard in the industry for the location of the driving connection on a spindle which imparts rotation to the spool or reel positioned thereon. As a result, film spools or reels have been devised that are interchangeable with respect to a particular type of apparatus, but such spools or reels are not reversible so as to permit any type of film to be wound or stored thereon in accordance with a requisite orientation of the emulsion side which can be used interchangeably in apparatus of different manufacture.

An object of the invention is to provide a reversible reel that can be used interchangeably with various types of photographic apparatus.

Another object of the invention is to provide a reversible reel on which a film strip can be stored with the emulsion side thereof wound toward or away from the core and with either flange facing the driving connection so that the reel is usable interchangeably with various types of photographic apparatus.

Still another object of the invention is to provide a reversible reel that can be readily fabricated as a single one piece unit and that is sturdy, simple in construction and inexpensive to manufacture.

Other objects and advantages of the present invention will be apparent to those skilled in the art by the description of a preferred embodiment of the invention which follows.

Accordingly, the present invention provides a unique combination of openings, cavities, and flange members in a film reel core which permits its proper orientation regardless of the apparatus with which it is used. While the invention is shown and described in conjunction with a film reel having spaced flanges, it is also applicable to a single flanged reel or to a cylindrical member or core on which a film strip can also be wound and stored. The term "reel" as used in the present application is therefore meant to define in a generic sense any member with or without flanges on which an unexposed or processed strip of film can be wound.

Reference is now made to the accompanying drawing wherein like reference numerals and characters designate like parts and wherein:

FIG. 1 is a side view of one face of a reel showing the location of the openings and cavities in the core;

FIG. 2 is a side view of the other face of the reel showing the location of the openings and cavities in the core;

FIG. 3 is a sectional view taken substantially along line 3—3 in FIG. 1;

FIG. 4 is a sectional view taken substantially along line 4—4 in FIG. 1;

FIG. 5 is a sectional view taken substantially along line 5—5 in FIG. 1;

FIG. 6 is an end view of a reel showing the aperture in the core for receiving an end of a film strip; and FIG. 7 is a partial perspective view of a spindle showing relative locations of various driving connections thereon.

With particular reference to FIG. 6, a reel 10 is shown as comprising a pair of spaced flanges 11 and 12 and a core or hub portion 13 that is disposed between the flanges and arranged concentric therewith. The core 13 is provided with an axial slot S for receiving an end of a film strip as is well known in the art. From the description which follows it can be readily appreciated that reel 10 can be molded, or otherwise fabricated, as a single unit from any thermoplastic or thermosetting materials, or die cast in one piece from various metal alloys.

The core 13 comprises an end wall 14 whose outer surface is coplanar with the outer surface 15 of the flange 12. The wall 14 is provided with a central opening 16, with a first opening 17 comprising a circular portion 18 and a keyway 19 that is radially disposed toward the central opening 16, and with a second opening 20 comprising a circular portion 21 and a radial slot 22 that connects portion 21 with the central opening 16.

The core 13 is also provided with a second end wall 25 whose outer surface is disposed inwardly from the outer surface 26 of flange 11. For certain applications the reel 10 is provided with an annular ring 27 that corresponds substantially in diameter to that of core 13 and extends beyond the surface 26, as seen in FIG. 4. A central cavity 28 extends from the wall 25 into core 13 and terminates at the inner surface of wall 14. This cavity has a square inner surface 29 that circumscribes the central opening 16 and has extensions 30 and 31 that are co-extensive with and conform to the peripheral outline of the circular portions 18 and 21 of openings 17 and 20, the sides of keyway 19 and the sides of radial slot 22 in end wall (see FIG. 1).

As seen in FIGS. 1 and 2, a pair of cavities 35 and 36 also extend into the core 13 and terminate at the inner surface of the end wall 14. A second pair of cavities 37 and 38 extend into the core 13 and terminate at the inner surface of the end wall 25. The cavities 37 and 38, see FIG. 2, are provided with ribs 39 and 40 that can extend partially toward or terminate at wall 25 and are provided so as to divide the cavities, thereby reducing the size of the cavities to prevent inadvertent entry into these cavities of the driving connection on a spindle. With reference to FIG. 1, it can be readily seen that each of cavities 35 and 36 is adjacent one of a pair of opposite sides of the square inner surface 29, and each of cavities 37 and 38 is adjacent one of the pair of other opposite sides so that the walls W of the cavities 35, 36, 37 and 38 are common in part to each other and to the central cavity 28.

The end wall 25 is provided with a pair of arcuate stabilizing members 41 and 42 which are concentric with the axis of rotation of reel 10 and extend outwardly from the end wall 25, the outer surfaces 43 and 44 thereof being coplanar with the outer surface 26 of flange 11. The purpose of such stabilizing members is more fully described hereinafter.

As seen in FIG. 7, a spindle 50 can be cylindrical as shown, or square with a cylindrical end, and provided with any one of a number of different driving connections that are located in different positions relative to the spindle. Key 51 is shown as being located inwardly from the outer end of spindle 50, whereas key 52 is shown as being positioned at the end of the spindle and adjacent to a flange 53 that is integral with the spindle. A key 54 is shown as being radially arranged on flange 53, whereas pin 55 is fixed to flange 53 and displaced radially from spindle 50. Another form of drive member (not shown) is an axially arranged resilient member in one of the square faces on a spindle which frictionally retains a reel positioned thereon. Each of the aforementioned driving connections would require a different type of opening in either a flange or a wall of a core or hub portion, as well as such opening being located in a different position in the reel in order that each driving connection could impart the rotation of the spindle 50 to a reel that is positioned thereon. It is in conjunction with such driving connections that the film reel 10 can be used, providing the proper flange in accordance with the film strip wound thereon faces the spindle when the reel is positioned on the spindle.

Assuming that the film strip wound on reel 10 requires the flange 12 to face the driving connection, the slot 22 would therefore permit engagement of either of keys 51 and 52 or the radial key 54, whereas either portion 18 or 21 would accept the pin 55. The portions 18 and 21 are of such a size as to receive the largest pin 55 that is currently used as a driving connection in known photographic apparatus. If the film strip wound on reel 10 is oriented such that the flange 11 is to face the driving connection, the central cavity 28 will engage the spindle along four lines of contact and the central opening 16 will permit the outer end of the spindle to pass therethrough. Again, either of keys 51 or 52 can be engaged by the extension 30 and the key 54 can be engaged by the radial portion of extension 31. Likewise, pin 55 can be engaged in accordance with its location by either the part of extension 30 corresponding to portion 21 or the portion of extension 31 corresponding to the position 18. In instances where the spindle 50 has a flange 53 and the reel 10 is provided with an annular ring 27, the latter is of such size that it can overlie the flange and stability is then given to the reel by surfaces 43 and 44 of members 41 and 42 engaging the face of flange 53. Normally a reel 10 is positioned on spindle 50 with the proper flange facing the spindle. The reel is then rotated slowly and at the same time moved along the spindle to locate the driving connection. When a reel 10 is positioned on spindle 50 with members 41 and 42 facing the spindle 50 and the driving connection to be engaged is either key 54 or pin 55, the possibility of interference with rotation of the reel before it is actually engaged by the driving connection, due to an end of member 41 or 42 engaging the key 54 or pin 55, can be reduced by tapering each end of members 41 and 42 toward the end wall 25.

From the above description it should be evident to one skilled in the art that the openings in the end walls of the core 13 as well as the cavities extending into said core permit the reel 10 of the present invention to be positioned on a spindle 50 with either flange 11 or flange 12 facing the driving connection so that the rotation of the spindle is imparted to the reel. Also, the openings and the cavities in the core are not a part of the flanges so that for certain applications one or both of the flanges can be eliminated, if desired or necessary.

The invention has been described in detail with particular reference to preferred embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. A universal film reel positionable on a spindle having a driving connection for rotating said reel, comprising:
   a first flange;
   a second flange spaced from said first flange;
   a cylindrical core disposed between said flanges;
   said core including a first end wall that is substantially coplanar with said first flange and a second end wall that is displaced inwardly from said second flange;
   said first end wall being provided with a central opening for engaging said spindle and locating said reel therealong, a first opening including a circular portion having a radial keyway directed toward said central opening, and a second opening including a circular portion joined to said central opening by a radial slot, said first and second openings selectively engaging said driving connection in accordance with its location when said reel is positioned on said spindle with said first flange facing said driving connection;
   each of said first and second openings being positioned along a respective one of a pair of perpendicular radii at different distances from the center of said central opening;
   a substantially central cavity extending from said second end wall into said core and terminating at said first end wall and having an inner surface comprising a square central portion that circumscribes said central opening for engaging said spindle and extensions thereof that are co-extensive with and conform to the peripheral outline of said circular portions, said keyway and said slot for selective engagement by said driving connection in accordance with its location when said reel is positioned on said spindle with said second flange facing said driving connection; and
   a plurality of cavities extending from said first and second end walls into said core and terminating at an opposite one of said respective first and second end walls and shaped and arranged relative to said central opening, said first and second openings and said central cavity so as to prevent acceptance of said driving connection thereby.

2. A universal film reel in accordance with claim 1 wherein said core is provided with an axial opening into one of said cavities for receiving an end of a film strip to be wound thereon.

3. A universal film reel in accordance with claim 1 including means on said second end wall for stabilizing said reel when the latter is positioned on said spindle with said second flange facing said driving connection.

4. A universal film reel in accordance with claim 3 wherein said stabilizing means comprises at least a pair of spaced arcuate members having their outer faces substantially coplanar with said second flange.

5. A universal film reel positionable on a spindle having a driving connection for rotating said reel comprising:
   a first flange having an outer surface;

a second flange having an outer surface and spaced from said first flange;

a cylindrical core disposed between said flanges;

said core including a first end wall having an outer surface that is coplanar with the outer surface of said first flange and a second end wall having an outer surface that is displaced inwardly from the outer surface of said second flange;

said first end wall being provided with a central circular opening for engaging said spindle and locating said reel therealong, a first opening including a circular portion having a radial keyway directed toward said central opening and a second opening including a circular portion joined to said central opening by a radial slot, said first and second openings selectively engaging said driving connection in accordance with its location when said reel is positioned on said spindle with said first flange facing said driving connection;

each of said first and second openings being positioned along a respective one of a pair of perpendicular radii at different distances from the center of said central opening;

a substantially central cavity extending from said second end wall into said core and terminating at said first end wall and having an inner surface comprising a square central portion that circumscribes said central opening for engaging said spindle and extensions thereof that are co-extensive with and conform to the outline of said circular portions, said keyway and said slot for selectively engaging said driving connection in accordance with its location when said reel is positioned on said spindle with said second flange facing said driving connection;

a first pair of cavities extending from said second end wall into said core, each of which is adjacent one of a pair of opposite sides of said square central portion and extends to said first end wall; and a second pair of cavities extending from said first end wall into said core, each of which is adjacent one of the other pair of opposite sides of said square central portion and extends to said second end wall;

said first pair of cavities being shaped and arranged with respect to said central cavity so as to prevent acceptance of said driving connection thereby.

6. A universal film reel in accordance with claim 5 wherein said core is provided with an axial opening into one of said second pair of cavities for receiving an end of a film strip to be wound thereon.

7. A universal film reel in accordance with claim 5 including means on said second end wall for stabilizing said reel when the latter is positioned on said spindle with said second flange facing said driving connection.

8. A universal film reel in accordance with claim 7 wherein said stabilizing means comprises at least a pair of spaced arcuate members having their outer faces substantially coplanar with the outer surface of said second flange.

9. A universal cylindrical film core positionable on a spindle having a driving connection for rotating said core, comprising:

a first end wall that is substantially coplanar with one end face of said core;

a second end wall that is displaced inwardly from the other end face of said core;

said first end wall being provided with a central opening for engaging said spindle and locating said core therealong, a first opening including a circular portion having a radial keyway directed toward said central opening, and a second opening including a circular portion joined to said central opening by a radial slot, said first and second openings selectively engaging said driving connection in accordance with its location when said core is positioned on said spindle with said first end wall facing said driving connection;

each of said first and second openings being positioned along a respective one of a pair of perpendicular radii at different distances from the center of said central opening;

a substantially central cavity extending from said second end wall into said core and terminating at said first end wall and having an inner surface comprising a square central portion that circumscribes said central opening for engaging said spindle and extensions thereof that are co-extensive with and conform to the peripheral outline of said circular portions, said keyway and said slot for selective engagement by said driving connection in accordance with its location when said core is positioned on said spindle with said second end wall facing said driving connection; and a plurality of cavities extending from said first and second end walls into said core and terminating at an opposite one of said respective first and second end walls and shaped and arranged relative to said central opening, said first and second openings and said central cavity so as to prevent acceptance of said driving connection thereby.

10. A universal film core in accordance with claim 9 including means on said second end wall for stabilizing said core when the latter is positioned on said spindle with said second end wall facing said driving connection.

11. A universal film core in accordance with claim 10 wherein said stabilizing means comprises at least a pair of arcuate members having their outer faces substantially coplanar with the other end of said core.

References Cited

UNITED STATES PATENTS

| | | | |
|---|---|---|---|
| 2,468,767 | 5/1949 | Lloyd | 242—71.8 |
| 2,766,947 | 10/1956 | Hultgren | 242—71.8 |
| 2,974,892 | 3/1961 | Geloso | 242—71.8 |

FRANK J. COHEN, *Primary Examiner.*

N. L. MINTZ, *Assistant Examiner.*